United States Patent
Ray et al.

(10) Patent No.: US 9,658,337 B2
(45) Date of Patent: May 23, 2017

(54) LARGE DROPLET DETECTION BY STATISTICAL FLUCTUATIONS IN LIDAR BACKSCATTER

(71) Applicant: Rosemount Aerospace Inc., Burnsville, MN (US)

(72) Inventors: Mark D. Ray, Burnsville, MN (US); Kaare Josef Anderson, Farmington, MN (US); Mark Sherwood Miller, Apple Valley, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 958 days.

(21) Appl. No.: 13/923,808

(22) Filed: Jun. 21, 2013

(65) Prior Publication Data

US 2014/0379263 A1    Dec. 25, 2014

(51) Int. Cl.
*G01S 17/95* (2006.01)
*G01S 7/48* (2006.01)

(52) U.S. Cl.
CPC .......... *G01S 17/95* (2013.01); *G01S 7/4802* (2013.01)

(58) Field of Classification Search
CPC .............................. G01S 17/95; G01S 7/4802
See application file for complete search history.

(56) References Cited

U.S. PATENT DOCUMENTS

| | | |
|---|---|---|
| 4,359,640 A | 11/1982 | Geiger |
| 7,839,491 B2 * | 11/2010 | Harris ..................... G01S 17/95 356/4.01 |
| 7,986,408 B2 | 7/2011 | Ray et al. |
| 8,144,325 B2 | 3/2012 | Ray et al. |
| 8,338,785 B2 | 12/2012 | Ray |
| 2011/0019188 A1 * | 1/2011 | Ray ........................ B64D 15/20 356/342 |

FOREIGN PATENT DOCUMENTS

EP    2587277 A1    5/2013

OTHER PUBLICATIONS

Larkin, "An algorithm for assessing bimodality vs. unimodality in a univariate distribution", Behavior Research Methods & Instrumentation 11 (4) (1979) pp. 467-468.*
Segal et al. "Thermodynamic factors influencing bimodal spectrum formation in cumulus clouds," Atmospheric REsearch 66 (2003) pp. 43-64.*
Ray et al., Optical Detection of Airborne Ice Crystals and Liquid Water Droplets, AIAA 2009.*
Extended European Search Report for European Patent Application No. 14173153, dated Jan. 14, 2015.

(Continued)

*Primary Examiner* — Mohamed Charioui
*Assistant Examiner* — Catherine Rastovski
(74) *Attorney, Agent, or Firm* — Locke Lord LLP

(57) ABSTRACT

A method of optically detecting the presence of a bimodal droplet size distribution in the atmosphere. The method comprising monitoring statistical fluctuations in a backscattered signal received from a series of pulsed laser light beams directed into a cloud and analyzing the statistics of the fluctuations of the backscattered signals to identify the presence of larger diameter droplets.

8 Claims, 3 Drawing Sheets

(56) References Cited

OTHER PUBLICATIONS

Jagodnicka, A.K., et al: "Particle size distribution retrieval from multiwavelength lidar signals for droplet aerosol", Applied Optics, Optical Society of America, Washington, Dc; US, vol. 48, No. 4, Feb. 1, 2009, pp. B8-B16, XP001521666, ISSN: 0003-6935, DOI: 10.1364/A0.48.000088.

Gilles, Roy, et al: "Retrieval of Droplet-Size Density Distribution from Multiple-Field-of-View Cross-Polarized Lidar Signals: Theory and Experimental Validation", Applied Optics, vol. 38, No. 24, Aug. 20, 1999, p. 5202, XP055050691, ISSN: 0003-6935, DOI: 10.1364/A0.38.005202.

* cited by examiner

LARGE DROPLET DETECTION BY STATISTICAL FLUCTUATIONS IN LIDAR BACKSCATTER

BACKGROUND OF THE INVENTION

1. Field of the Invention

The present invention relates to sensors, e.g., in-flight sensors on board an aircraft, and more particularly to detecting clouds with bimodal droplet size distributions.

2. Description of Related Art

The detection of airborne liquid droplets and their classification according to droplet size is an important function of an in-flight sensor on board an aircraft. Large droplets, though much fewer in number than smaller droplets, present a greater threat to aircraft icing. The ability to detect bimodal droplet size distributions in icing clouds is important for an aircraft icing conditions sensor.

The Optical Ice Detector (OID) is an example of an airborne icing conditions sensor with pulsed laser light beams at two different wavelengths (e.g. 905 nm and 1550 nm). When the laser beams are directed into a cloud, the received laser echoes due to backscattering from the droplets are analyzed to estimate the median volume diameter (MVD), the maximum droplet diameter ($D_{max}$), and the liquid water content (LWC) of the cloud. Each laser pulse samples many different droplet sizes at one time and generates a composite backscattered signal. The current scheme for classifying icing clouds is to measure the two color ratio (the ratio of intensities of backscattered light at 905 nm to that at 1550 nm), the optical extinction coefficient at 905 nm, and the lidar ratio (the ratio of the optical extinction to backscatter at 905 nm).

These three measurements work well for classifying clouds with a single mode droplet size distribution. However, droplet size distributions in naturally-occurring clouds are often bimodal due mainly to droplet coalescence. One of the modes occurs at small droplet diameters (~10 to 20 μm), while larger droplets create a secondary mode at greater than ~40 μm diameter, depending on the nature of the clouds. Because they are more numerous, small droplets (despite their small areal cross-sections) generate more composite extinction and backscatter than do large droplets. The result is that the extinction, two-color ratio, and the lidar ratio are dominated by scattering from small droplets, even though the fewer large droplets in a bimodal cloud can account for a sizeable fraction of the total liquid water content. Therefore, there is still a need in the art for an improved system and method for determining the presence of large droplets in clouds with bimodal droplet size distributions.

SUMMARY OF THE INVENTION

The subject invention is directed to a new and useful method using an optical ice detector (OID) for detecting bimodal droplet size distributions within a cloud.

In one aspect of the invention a method of optically detecting the presence of a bimodal droplet size distribution in the atmosphere is disclosed. The method comprises monitoring statistical fluctuations in a backscattered signal received from a series of pulsed laser light beams directed into a cloud and analyzing the statistics of the fluctuations of the backscattered signals to identify the presence of larger diameter droplets. The step of analyzing may include calculating a characteristic magnitude of fluctuations of the backscattered signal and identifying fluctuations of backscattered signals greater than those typical for a single-mode small droplet cloud to determine whether there is bimodal droplet size distribution with the cloud. The method may also include directing pulsed laser beams at wavelengths of 905 nm and 1550 nm. The step of calculating may also include receiving the backscattered signal from the laser light beam through an optical receiver.

In another aspect of the invention a method of optically detecting a bimodal droplet size distribution within a cloud is disclosed. The method comprises, first, directing a laser light beam into a volume of space of the cloud. Next, a backscattered signal received from the laser light beam is measured. The statistical fluctuations in the backscattered signal are monitored and an average backscattered signal from the illuminated cloud is calculated. Finally, backscattered signal fluctuations beyond a threshold are identified to determine the presence of a secondary mode of large droplets within the droplet size distribution of the cloud.

In another aspect of the invention, the presence of a secondary droplet diameter mode greater than 40 μm is identified.

In yet another aspect of the invention pulsed laser beams at wavelength of 905 nm and 1550 nm are emitted.

In another aspect of the invention the backscattered signal is received through an optical receiver corresponding to the laser light beam.

In another aspect of the invention an apparatus for optically detecting bimodal droplet size distributions within a cloud is disclosed. The apparatus comprises a laser system configured to direct a laser light beam into the cloud and an optical receiver configured to measure the backscattered signal received from the laser light beam. A processor is configured to analyze the statistics of the fluctuations of the backscattered signal within the volume of the cloud illuminated to distinguish a cloud with a bimodal droplet size distribution from that with a single-mode size distribution. The processor is configured to calculate an average of the backscattered signals and identify fluctuations of backscattered signals beyond a threshold to determine the presence of a secondary mode of large droplets in the droplet diameter distribution. The laser system may emit pulsed laser beams at wavelengths of 905 nm and 1550 nm.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

WRITTEN DESCRIPTION OF CERTAIN EMBODIMENTS OF THE INVENTION

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as representative for teaching one skilled in the art to variously employ the present invention. Furthermore, the terms and phrases used herein are not intended to be limiting but rather to provide an understandable description of the invention.

Commonly assigned U.S. Pat. Nos. 7,986,408, 8,144,325, and 8,338,785 are incorporated by referenced herein and describe various aspect of devices for detecting and distinguishing airborne liquid water droplets and ice crystals.

The detection of large droplets in a bimodal cloud requires a technique that is sensitive to the backscatter from the relatively small number of large droplets rather than the collective backscatter of the cloud, which is dominated by the backscatter from the more numerous small droplets. It is understood that in the present context, a "cloud" encompasses not only the familiar formations that are visible to a naked eye, but may also include groups of water droplets and masses of ice crystals found at high altitudes, which may result of updrafts from lower clouds.

For a cloud with a droplet size density distribution function n(r), the number of droplets with radius r within a range of sizes dr contained in the laser illumination volume V is:

$$N(r)=n(r)Vdr$$

provided that n(r)dr sums to Z over all possible r, where Z is the total number of droplets per unit volume within the cloud. From each laser pulse to the next, this finite number of droplets n(r)dr exhibits fluctuations δn(r)dr associated with Poisson counting statistics. The relative magnitude of these fluctuations [i.e. δn(r)/n(r)] decreases as n(r) increases because of the inverse relationship between n(r) and δn(r). Statistical measurements (e.g. standard deviation, kurtosis, etc.) of these fluctuations are useful because the fluctuations in the backscattered signal result directly from the variations δn(r)dr.

Figure 1:
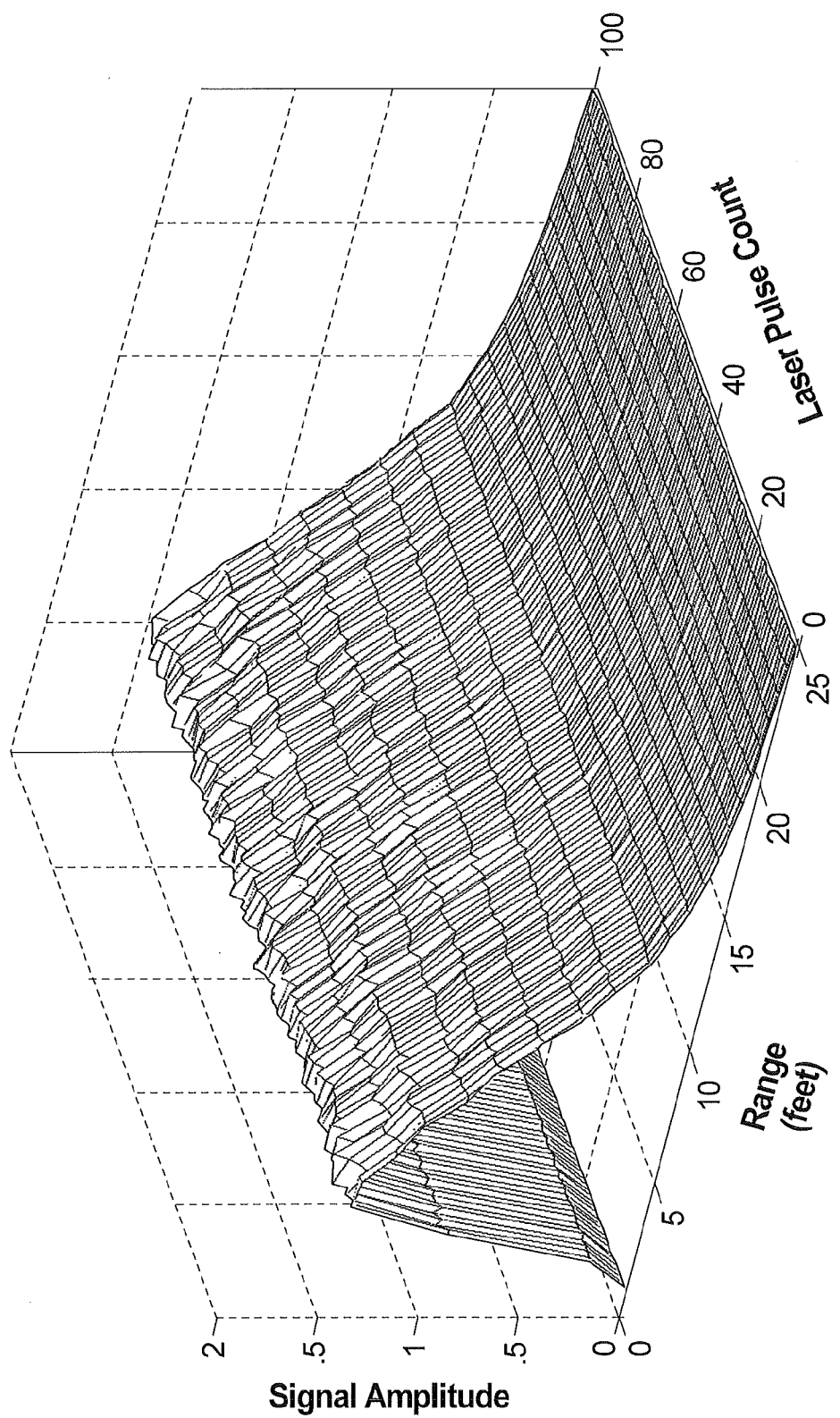
FIG. 1 is a graph constructed in accordance with the present disclosure, showing a series of backscattered light signals from individual laser pulses separated in time by the inverse of the laser pulse rate. The backscattered signal for each laser pulse is a curve composed of the intensities of the backscattered light at various ranges from the OID. Fluctuations in the backscattered signal about an average backscattered signal can be seen. This graph is specifically the backscattered signals from only small liquid droplets.

The ubiquitous small droplets in a bimodal distribution generate a backscatter that varies little from one laser pulse to the next, as shown in FIG. 1, because these small droplets are numerous and have small relative fluctuations in their droplet size density. FIG. 1 illustrates a simulation of the Optical Ice Detector (OID) laser backscatter for a droplet size distribution of a freezing drizzle cloud when a laser light beam is directed into the cloud. The range axis in FIG. 1 is the distance from the OID of the portion of the cloud that generated the signal at that particular point. The range is computed from the amount of time elapsed between the firing of the laser pulse and the reception of the backscattered signal through an optical receiver. As indicated, the overall shape and smoothness of the signal vs. range curve varies little between consecutive laser pulses, indicating the majority of liquid droplets are small and numerous, with little fluctuations in their size distributions both temporally (i.e. from one laser pulse to the next) and spatially (i.e. along the length of the cloud sampled by a single pulse from the OID), and therefore the detected cloud has a small-diameter, single mode droplet size distribution.

Figure 2:
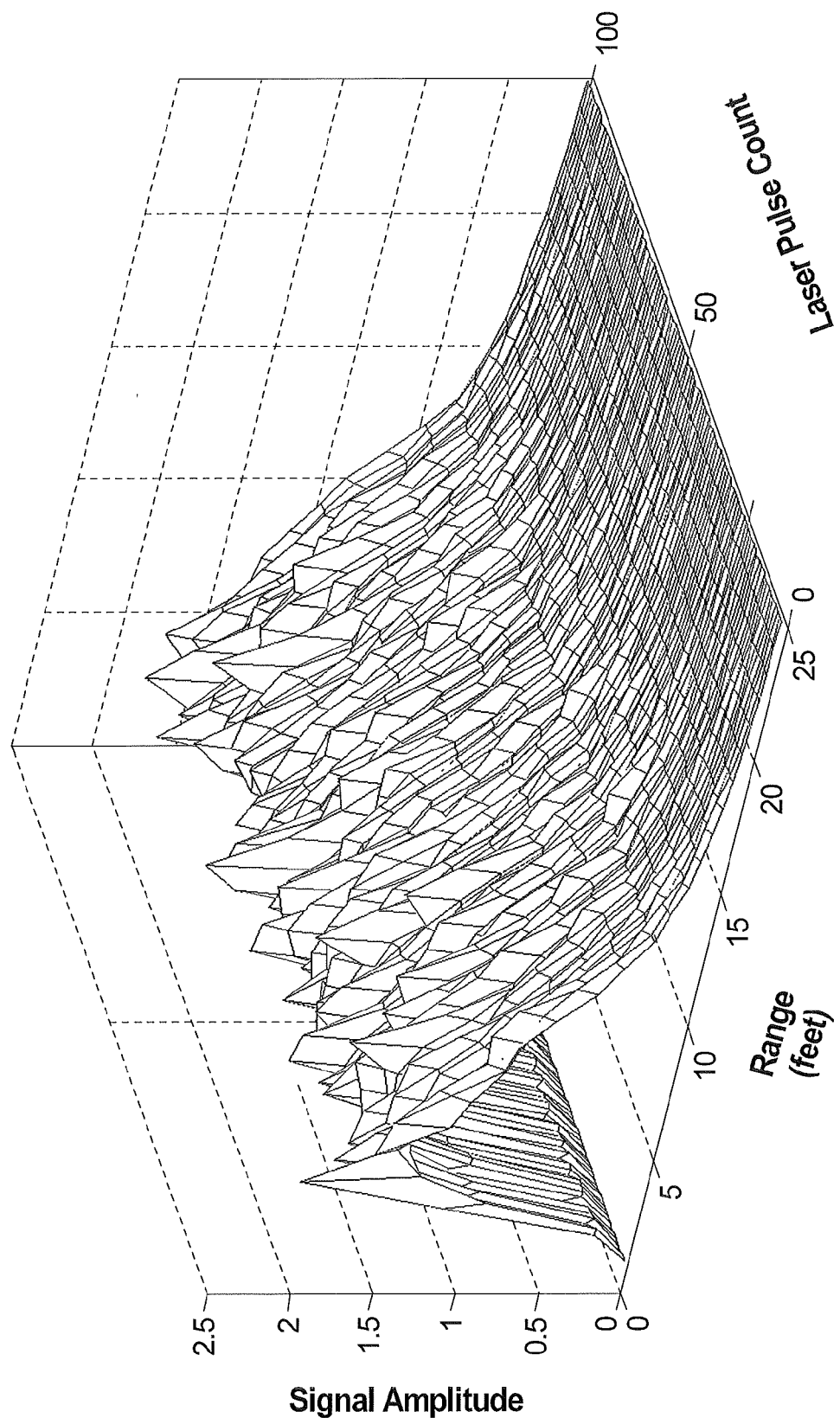
FIG. 2 is a graph similar to FIG. 1, but showing the fluctuations in the backscattered signal with fluctuations of increased amplitude due to the presence of large liquid droplets in addition to small droplets.

As shown in FIG. 2, the same simulation method is employed with a freezing rain cloud with a bimodal droplet size distribution, illustrating the increase in fluctuations in the backscatter created by the large droplets compared to average signal amplitude for a bimodal cloud. The fluctuations in the backscatter signal are greater for the few large droplets than those generated by the more numerous small droplets. The measurements shown in FIG. 2 (from a freezing rain cloud) illustrate the large fluctuations seen when large droplets are present. In other words, the fluctuations in the signal in FIG. 2, whether observed temporally from one laser pulse to the next or spatially along the length of the cloud probed by the laser pulse, indicate the presence of large water droplets in a secondary mode of the droplet size distribution. As discussed above, small droplets have a mode in the droplet size density n(r) at ~10 to 20 µm diameter, whereas larger droplets produce a secondary mode at greater than ~40 µm diameter.

Figure 3:
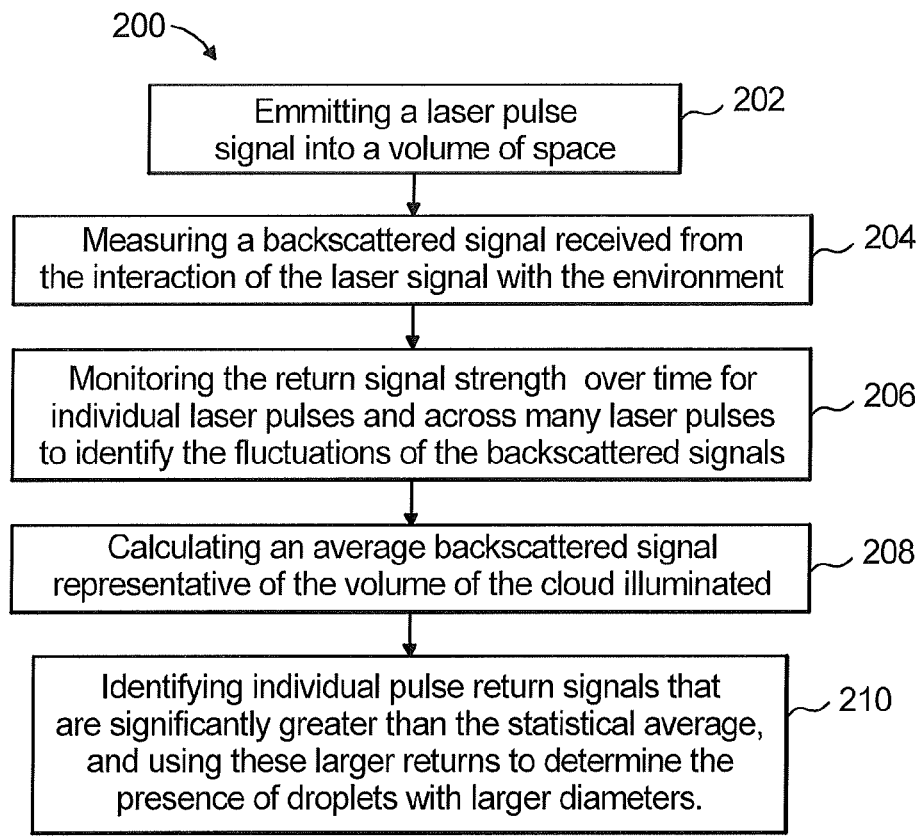
FIG. 3 is a flow chart illustrating an exemplary embodiment of a method in accordance with the present disclosure.

The method in accordance with the present invention is shown in FIG. 3 and will be described herein. Flow chart 200 illustrates the steps to measure the signal fluctuations and therefore the presence of large water droplets within a cloud. First, at step 202, a laser light beam is directed into a volume of space. Next, at step 204, a backscattered signal received from the laser light beam is detected and measured. The signals are monitored and averaged over multiple laser pulses as shown in step 206. In step 208, the presence of large droplets in a secondary mode of the droplet size distribution is determined from calculating a statistical analysis of the fluctuations. The return signals that are significantly greater than the statistical average are identified to determine the presence of droplets with larger diameters as shown in step 210. One method is to tabulate the fluctuations in the signal temporally, from one laser pulse to the next for a portion of the cloud at a fixed range from the OID. This process can be repeated for portions of the cloud at other fixed ranges from the OID. Another method is to compute the fluctuations in the signal spatially, along the distance into the cloud that the laser beam penetrates, for each of the laser pulses. A third method is to examine the fluctuations in both space and time simultaneously, using a wavelet transformation, for example, or similar technique. This method is useful for clouds in which the dominant, small droplet size mode changes slightly during the time interval over which the measurement is performed. Regardless of the specific method of monitoring the fluctuations of the backscattered signal, small fluctuations in the signal indicate the presence of a large number of small droplets. Large fluctuations beyond a set threshold indicate the presence of less numerous large droplets associated with a second mode of the droplet size distribution.

Figure 4:
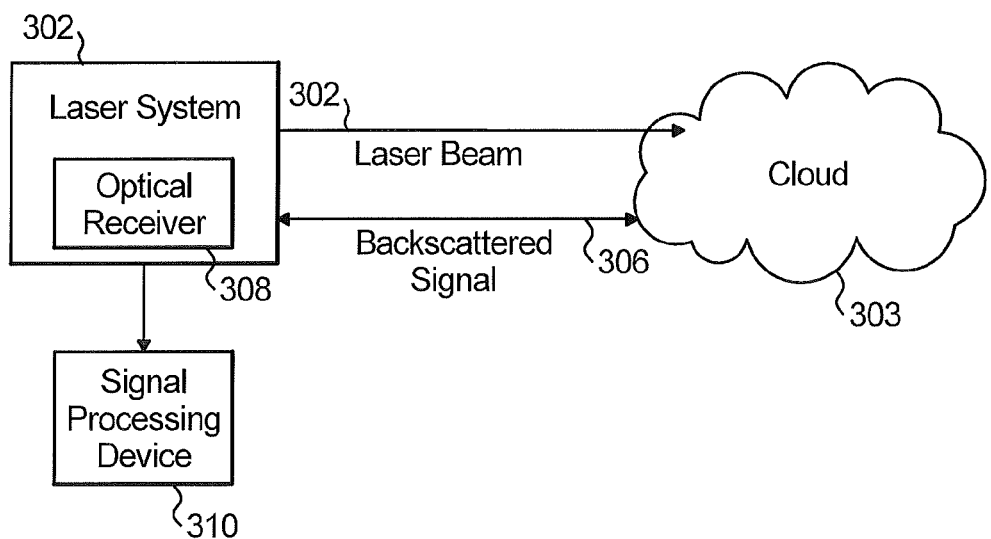
FIG. 4 is a schematic drawing illustrating an exemplary embodiment of an apparatus for performing the method of FIG. 3.

FIG. 4 is a schematic illustration of an apparatus 300 configured to perform the method according to the present invention. A laser system 302 directs the laser beam 304 into a volume of space within a cloud 303. The backscattered signal 306 is received with an optical receiver 308 correlating with the laser system 302. A signal processing device 310 operatively connected to the optical receiver 308 monitors the fluctuations of the backscattered signals 306 received from backscatter generated by the laser beam 304.

The above presents a description of a method for detecting aircraft conditions based on bimodal clouds, and of the manner and process of making and using them, in such full, clear, concise, and exact terms as to enable any person skilled in the pertinent art to make and use these devices and methods. The disclosed apparatus and method for detecting aircraft conditions are, however, susceptible to modifications and alternative method steps from those discussed above that are fully equivalent. Consequently, the disclosed apparatus and method for detecting aircraft conditions are not limited to the particular embodiments disclosed. On the contrary, the presently disclosed apparatus and method for detecting aircraft conditions encompasses all modifications and alternative constructions and methods coming within the spirit and scope of the present invention.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function, it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A method of optically detecting the presence of a bimodal droplet size distribution in the atmosphere, the method comprising:
   monitoring statistical fluctuations in a backscattered signal received from a series of pulsed laser light beams having wavelengths of 905 nm and 1550 nm directed into a cloud; and
   analyzing the statistics of the fluctuations of the backscattered signals to identify the presence of larger diameter droplets, wherein analyzing includes:
   examining fluctuations in space and time simultaneously using a wavelet transformation; and
   calculating a characteristic magnitude of fluctuations of the backscattered signal and identifying fluctuations of backscattered signals greater than those typical for a single-mode small droplet cloud to determine whether there is bimodal droplet size distribution within the cloud.

2. The method of claim 1, wherein the step of calculating includes receiving the backscattered signal from the laser light beams through an optical receiver.

3. The method of claim 1, wherein the larger diameter droplets include droplets having diameters at greater than 40 µm.

4. The method of claim 1, wherein the single mode small droplet cloud droplets having diameters of 10 µm to 20 µm.

5. A method of optically detecting a bimodal droplet size distribution within a cloud, the method comprising:
   directing a laser light beam into a volume of space of the cloud by emitting pulsed laser beams at wavelength of 905 nm and 1550 nm;
   measuring a backscattered signal received from the laser light beam;
   monitoring the statistical fluctuations in the backscattered signal by examining fluctuations in space and time simultaneously using a wavelet transformation;
   calculating an average backscattered signal from the illuminated cloud; and
   identifying backscattered signal fluctuations beyond a threshold to determine the presence of a secondary mode of larger diameter droplets within the droplet size distribution of the cloud.

6. The method of claim 5, wherein the step of identifying includes determining the presence of the secondary mode of larger diameter droplets having droplet diameters greater than 40 µm.

7. The method of claim 6, wherein the step of measuring includes, receiving the backscattered signal through an optical receiver corresponding to the laser light beam.

8. An apparatus for optically detecting bimodal droplet size distributions within a cloud, the apparatus comprising:
   a laser system configured to direct a laser light beam having wavelengths of 905 nm and 1550 nm into the cloud;
   an optical receiver configured to measure the backscattered signal received from the laser light beam; and
   a processor configured to analyze the statistics of the fluctuations of the backscattered signal with the volume of the cloud illuminated to distinguish a cloud with a bimodal droplet size distribution from that with a single-mode size distribution, wherein analyzing includes:
   examining fluctuations in space and time simultaneously using a wavelet transformation; and
   calculating an average of the backscattered signals and identifying fluctuations of backscattered signals beyond a threshold to determine the presence of a secondary mode of larger diameter droplets in the droplet diameter distribution within the cloud.

* * * * *